United States Patent Office 2,823,597
Patented Feb. 18, 1958

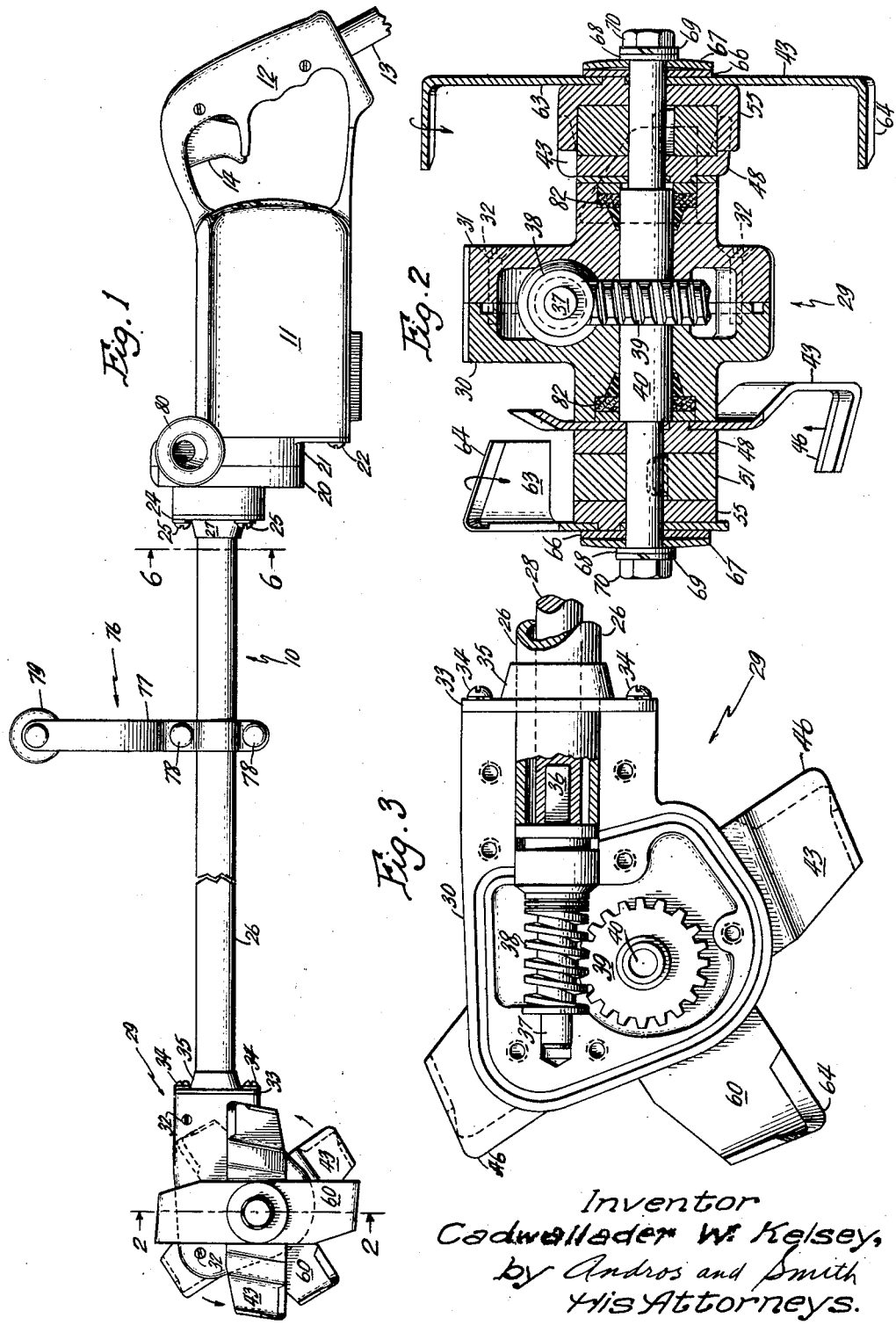

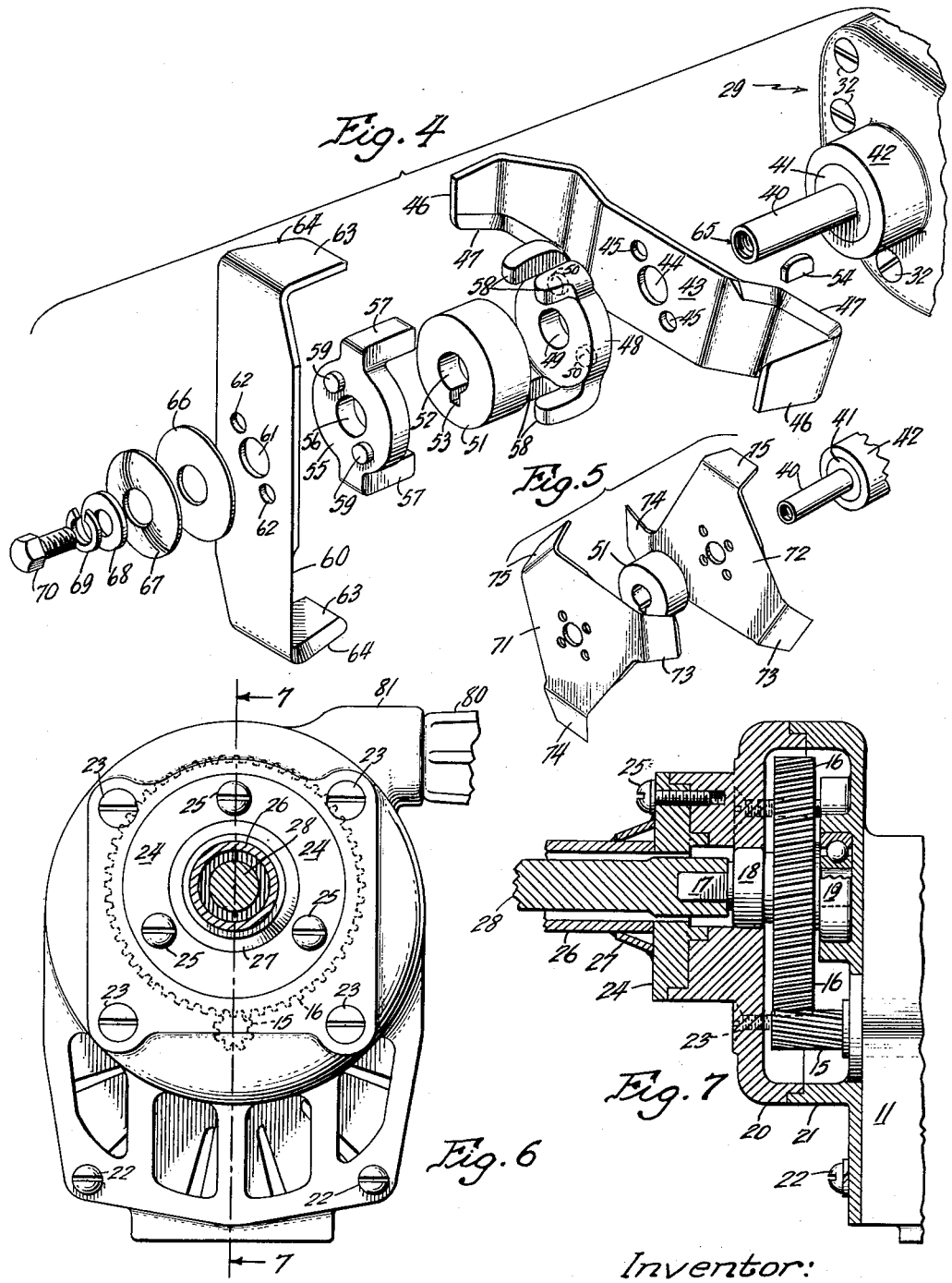

2,823,597

ROTARY SOIL WORKING DEVICE

Cadwallader W. Kelsey, Troy, N. Y.

Application September 3, 1953, Serial No. 378,208

5 Claims. (Cl. 97—40)

This invention relates to a power tool, having utility for numerous outdoor and indoor uses. More specifically, it pertains to a device that is especially adapted for use as a rotary soil working or tilling tool, of a size and weight adapting it for balanced manual manipulation, and the provision of such a device is a principal object of the invention.

Generally, it is an object of the invention to provide such a device that is simple, yet sturdy and durable of construction, economic of manufacture, which will operate with relative freedom from wear and tear and other mechanical difficulties, and which has a wide range of adaptability to other related outdoor and indoor uses as a power tool.

More specifically, it is an object of the invention primarily to provide a rotary soil tilling device of a size and weight readily adapting it for balanced manual manipulation, comprising an electric motor, a handle on the motor, an elongated shaft housing secured at one end thereof to the motor, a main shaft in the housing driven by the motor, a gear housing secured to the other end of the shaft housing, a transverse shaft mounted in said gear housing and driven by the main shaft, and a soil working tool mounted on the transverse shaft, the tool preferably comprising a plurality of soil working blades mounted on the transverse shaft at each side of the gear housing, which gear housing preferably contains suitable speed-reducing gears operatively connecting the main and transverse shafts.

Other specific objects of the invention are to provide such a device of the character described in which a friction clutch is interposed between the tool and transverse shaft, with means for adjusting the load under which the clutch will slip; in which the blades on either side of the gear housing are in fixed relation to each other with separate friction clutches being interposed between the shaft and blades on opposite sides of the gear housing; and in which the device is provided with a second handle and means adjustably securing it to the shaft housing at various distances from the handle on the electric motor, whereby a well-balanced and easily manipulatable device is achieved.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which:

Fig. 1 is a side elevational view of one embodiment of the invention, with a section broken out of the center for illustrative purposes;

Fig. 2 is a transverse sectional view, somewhat enlarged, taken along the lines 2—2 of Fig. 1 and looking in the direction of the arrows;

Fig. 3 is a side elevational view, somewhat enlarged, partly in section, and with parts broken away, of the gear housing and rotary tool portion of Fig. 1 with the housing and tools on the near side removed for illustrative purposes;

Fig. 4 is an exploded perspective view of the rotary soil working tool on one side of the transverse shaft and gear housing;

Fig. 5 is a perspective view of another form of rotary soil working tool arrangement;

Fig. 6 is a transverse elevational view, somewhat enlarged, taken along the lines 6—6 of Fig. 1 and looking in the direction of the arrows; and Fig. 7 is a fragmentary side elevational view, in section, taken along the lines 7—7 of Fig. 6 and looking in the direction of the arrows.

Referring now more particularly to the drawings, there is indicated generally at 10 (Fig. 1) one embodiment of the invention illustrating a rotary soil working device of a size and weight adapting it for balanced manipulation. The device consists of an electric motor 11 having a grip handle 12 from which extends an electric cord 13 adapted to be plugged into a socket. On the handle 12 is a finger trigger switch 14 which will close the circuit to set the electric motor in motion and keep it running only so long as the trigger is urged and maintained in a closed position as the handle 12 is gripped. The trigger 14 when released is outwardly spring-urged so that the circuit is broken immediately upon release thereof.

On the shaft of the electric motor (Fig. 7) is a small driving gear 15. Meshed therewith is a large speed reduction gear 16 mounted on a stud or jack shaft 17, which in turn is mounted in roller bearings 18 and 19. These roller bearings in turn are mounted in a split housing 20 and 21. The portion 21 of the split housing is secured to the motor housing by screws 22 and the portion 20 of the split housing is secured to the portion 21 by means of screws 23.

Mounted in the end of the split housing portion 20 is an end housing plate 24 which is secured in position by screws 25. An elongated shaft housing 26 extends from the plate 24 to which it is secured by means of a frusto-conical member 27, preferably being welded to the plate 24 and shaft housing 26.

An elongated main shaft 28 is located in the housing 26 and is provided with a socket at one end to receive the stud shaft 17 which preferably is square on its end to be received by the end of the socket in the shaft 28.

At the other end of the shaft housing 26 is a split gear housing indicated generally at 29. It will be observed from Fig. 1 that the shaft housing is indicated as having a section removed therefrom. In its shorter form the device as shown in Fig. 1 is adapted for use on bench work in greenhouses, and in its extended form adapted for use to reach directly to a ground surface and is of a length which will require little or no bending or stooping by an operator when used for such purposes.

The split gear housing 29 is composed of two separate parts and the split runs along the longitudinal axis of the device. Since the housing and connected parts on each side thereof are the same, similar reference numerals will be used for each. The split sections of the housing are indicated at 30 and 31 respectively and are joined together by suitable screws 32. At the rear end of this housing is a rear inner plate 33 which is connected to the sections 30 and 31 by screws 34. Connected to the plate 33 is another frusto-conical sleeve portion 35 into which extends the other end of the elongated shaft housing, terminating inwardly of the split housing 29. The opposite end of the elongated main shaft 28 is also recessed to receive the squared end 36 of another stud or jack shaft 37 mounted to rotate within the housing 29. The stud shaft 37 is provided with a driving worm 38. A worm wheel 39 is meshed with the worm 38 within the housing 29. The worm wheel 39 is mounted on a transverse shaft 40 extending through and laterally of both sides of the housing 29.

Since the rotary tool on both sides of the housing is the same, it will be necessary only to describe one side thereof, using similar reference numerals and for this purpose attention is particularly directed to the embodiment shown in Fig. 4. The transverse shaft 40 is journaled in suitable bearings 41 in the hubs 42 on the housing 29. Adapted to be mounted on the shaft 40 is a rotatable blade 43 having an opening 44 therein for the purpose of receiving the shaft 40. Adjacent the opening 44 are two additional but smaller openings 45. The blade has curved end portions 46 and is provided with oppositely disposed cutting edges 47. When the blade 43 is mounted in position on the shaft 40 a bifurcated female coupling member 48 is slipped on the shaft 40 having a central opening 49 for the purpose. Projecting from the coupling 48 are two studs 50 adapted to enter the openings 45 in the blade 43. A spacer bushing 51 is next mounted on the shaft having an opening 52 for the purpose. This opening is provided with a keyway 53 so that the same may be keyed to the shaft 40 by means of the key 54. A male coupling member 55 is next mounted on the shaft 40 having an opening 56 for the purpose. The male coupling member has single lug portions 57 adapted to be received by the bifurcated female portion provided by the spaced lugs 58. The male coupling is also provided with studs 59, similar to the studs 50 on the female coupling portion 48. A second blade 60 similar to the blade 43 is next placed on the shaft 40, also having an opening 61 for the purpose. This blade 60 is also provided with smaller openings 62 adjacent the opening 61 to receive the studs 59. This blade is also provided with curved end portions 63 having oppositely disposed cutting edges 64. Thus far, it should be observed that the shaft 40 is free to rotate with respect to the blades 43 and 60 and the coupling portions 48 and 55 but not with respect to the spacer bushing 51 which is keyed thereto by means of the key 54.

The end of the shaft 40 is internally threaded as indicated at 65. After the foregoing described members have been assembled on the shaft 40, a friction clutch arrangement is mounted in position after a suitable washer 66 has been slipped on the shaft 40 against the blade 60. One of the chief elements of the friction clutch is a dished or concavo-convex element 67 which is mounted on the shaft 40 following the washer 66. Another washer 68 followed by a lock washer 69 is mounted on the shaft 40 behind the friction clutch element 67 and these are all mounted and secured in position by the adjustable screw 70 which is screwed into the end of the shaft 40. By adjustment of this screw an adjustable friction clutch arrangement is provided. Tightening the screw 70 tends to flatten out the dished element 67 thereby increasing the tension whereby the coupling members and blades are firmly positioned on the shaft. This arangement is of particular importance where obstacles are encountered in different soils. For example, where stone, twigs, roots etc., would snag the rapidly rotating blades, there is no danger of breakage, shock, strain or overload being placed upon the motor. Only the shaft, bushing 51, and slip clutch arrangement will continue to rotate, free of any rotating motion being imparted to the rotary soil working blades.

The rotating blades 71 and 72 shown in Fig. 5 perform the same function as those shown in Fig. 4 except, instead of being elongated and having only two cutting portions, they are generally triangular in shape, each having three cutting portions 73, 74 and 75. Also, it will be observed that unlike the curved portions 46 and 63 in Fig. 4, these do not extend toward each other. On the contrary, they extend in the same direction, that is, toward the housing 29.

Of particular importance is the adjustable handle indicated generally at 76. This may comprise any suitable clamping arrangement such as oppositely disposed straps 77 (only one of which is shown) clamped on the shaft housing 26 by means of bolts 78 and carrying a gripping member 79 therebetween. The significance of this type of handle is that it can be moved to any suitable position along the housing 26 until a comfortable balance is obtained between the driving motor and the weight of the rotary tool arrangement with its associated gear and housing on the other end thereof. An additional auxiliary handle 80, which readily can be screwed and unscrewed into position, may be provided by supplying the split housing 21 with an extension 81 closely adjacent the motor. Furthermore, the split housing 29 is so constructed that it contains sealed therein a suitable quantity of lubricating oil. The shaft 40 is provided at its ends, where it is mounted within the housing, with suitable oil seals 82.

In operation, the device when used as a soil tilling machine, preferably is stroked by the operator toward himself much in the manner of one using a hoe. In this way, the proper position of the handle 76 can soon be determined. A small garden plot thus can readily be prepared for the reception of seeds. It will at once becomes obvious that it is no longer necessary to plow or dig up the entire garden area with this type of device available. On the contrary, it is only necessary to till or work the soil in spaced-apart stripes transversely of the garden plot.

The present invention has many other features and advantages. It answers a very definite need for a small garden machine, a demand for which has of recent years been created by many so-called walking garden tractors of the Rototiller type now on the market. It is powerful enough to dig deeply in hard soil and can also be used for cultivating, mulching and composting. It is so small and readily manipulatable that it can be used between plants. Such a tool can be operated under many conceivable conditions without weeds and tall grass winding up the plants and stalling the motor. It will work with equal facility in stony and sandy soil without danger of damage thereto. While it is rugged enough to stand the abuse of such conditions, it is also sufficiently light in weight so as to make it easy to handle for all operations. The weight of such a machine preferably is in the neighborhood of about 15 pounds, and is readily manipulatable because the rotary tools are largely ground supported while the rest of the weight remains in the operator's hands without the necessity of constantly bending the elbows and assuming uncomfortable stooping positions. No auxiliary means of support, such as straps over the shoulder, are necessary.

The device has utility as a household tool for outdoor as well as indoor use because it is readily convertible into other useful devices. For example, in addition to digging a garden for planting, and making cultivating and weeding under and around the plants, shrubs, bushes etc., a relatively simple operation, it can be provided with a lawnmower attachment, a chain saw attachment, a floor sanding and polishing attachment, and can also be converted into a small electric drill as well as a bench grinder.

It will thus be seen that the objects hereinbefore set forth may readily and efficiently be attained, and since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. A rotary soil working device of a size and weight adapting it for manual manipulation and to be supported and balanced by an operator; said device comprising an electric motor; a handle on said motor; an elongated shaft housing secured at one end thereof to said motor; a main shaft in said housing driven by said motor; a gear-housing secured to the other end of said shaft housing; a transverse shaft mounted in said gear-housing and driven by said main shaft; a plurality of soil-working blades mounted on said transverse shaft at each side of said gear-housing, said blades on either side of said gear-housing being in fixed relation to each other, and a friction clutch interposed between said blades and said transverse shaft; and a second handle secured to said shaft-housing in a zone intermediate said motor and said gear-housing, whereby said device is balanced and supported by the operator for manual manipulation.

2. A rotary soil working device of a size and weight adapting it for manual manipulation while supported and balanced by an operator; said device comprising an electric motor; a handle on said motor; an elongated shaft housing secured at one end thereof to said motor; a main shaft in said housing driven by said motor; a gear housing secured to the other end of said shaft housing; a transverse shaft mounted in said gear housing and driven by said main shaft; a soil working tool mounted on said transverse shaft; a friction clutch interposed between said tool and said transverse shaft; and a second handle secured to said shaft housing in a zone intermediate said motor and said housing, whereby said device is supported and balanced by said operator for manual manipulation.

3. A device as defined in claim 2, and further characterized in that said friction clutch is provided with means for adjusting the load under which said clutch will slip.

4. A device as defined in claim 2, and further characterized in that said second handle is provided with means adjustably securing it to said shaft housing at various distances from said first mentioned handle.

5. A device of the character described to be balanced and supported by an operator for manual manipulation, comprising an electric motor; a handle on said motor; a straight elongated, tubular shaft housing secured at one end thereof to said motor; a main shaft in said housing; speed reducing gears operatively connecting said motor with said shaft for driving the latter; a gear housing secured to said shaft housing at the other end thereof; a transversely extending shaft mounted in said housing and extending beyond each side of said housing; rotary tools mounted on each side of said transverse shaft on opposite sides of said housing; a friction clutch interposed between said tools and said transverse shaft on each side of said housing; speed reducing gears in said gear housing operatively connecting said main and transverse shaft; and a second handle secured to said shaft housing in a zone intermediate said motor and said gear housing, whereby said device is supported and balanced by said operator for manual manipulation.

References Cited in the file of this patent

UNITED STATES PATENTS

| | | |
|---|---|---|
| 1,660,764 | Pidlisny | Feb. 28, 1928 |
| 1,971,938 | Pedersen | Aug. 28, 1934 |
| 2,062,820 | Pierce | Dec. 1, 1936 |
| 2,458,200 | Renfroe et al. | Jan. 4, 1949 |
| 2,515,268 | Seaman | July 18, 1950 |
| 2,699,605 | Setter | Jan. 18, 1955 |

FOREIGN PATENTS

| | | |
|---|---|---|
| 603,299 | France | Jan. 8, 1926 |
| 194,113 | Switzerland | Feb. 1, 1938 |